United States Patent [19]
Nonaka

[11] Patent Number: 5,241,939
[45] Date of Patent: Sep. 7, 1993

[54] FUEL INJECTION CONTROL SYSTEM FOR ENGINE

[75] Inventor: Kimihiko Nonaka, Hamamatsu, Japan

[73] Assignee: Yamaha Hatsudoki Kabushiki Kaisha, Iwata, Japan

[21] Appl. No.: 790,220

[22] Filed: Nov. 8, 1991

[30] Foreign Application Priority Data

Nov. 13, 1990 [JP] Japan .................................. 2-303837

[51] Int. Cl.$^5$ ...................... F02D 41/10; F02D 41/12
[52] U.S. Cl. .................................... 123/492; 123/493
[58] Field of Search ..................... 123/492, 493, 305

[56] References Cited

U.S. PATENT DOCUMENTS

| | | | |
|---|---|---|---|
| 4,191,137 | 3/1980 | Williams et al. | 123/492 |
| 4,725,954 | 2/1988 | Takao et al. | 123/492 |
| 4,754,736 | 7/1988 | Yamato et al. | 123/492 |
| 4,827,887 | 5/1989 | Leshner | 123/493 |

FOREIGN PATENT DOCUMENTS 59-29733  2/1984  Japan .................................. 123/492

Primary Examiner—Andrew M. Dolinar
Attorney, Agent, or Firm—Harness, Dickey & Pierce

[57] ABSTRACT

A fuel injection control system for an internal combustion engine wherein the fuel control operates on load range strategies and wherein the amount of fuel is adjusted either by changing the duration or timing of injection during certain transient conditions so as to improve running and prevent stalling.

21 Claims, 6 Drawing Sheets

FUEL INJECTION CONTROL SYSTEM FOR ENGINE

BACKGROUND OF THE INVENTION

This invention relates to a fuel injection control system for an internal combustion engine and more particularly to an improved control system for coping with transient conditions.

The use of fuel injection and particularly direct cylinder fuel injection seems to be a viable way of coping with the control of exhaust gas emissions and the achievement of high fuel efficiency with internal combustion engines. This is particularly true in conjunction with two cycle, crankcase compression internal combustion engine. However, it is essential to provide an adequate and yet relatively simple control for the amount of fuel and timing of the fuel injected by the fuel injector to achieve the desired results.

The amount of fuel injected by the fuel injector and the timing of the injection is controlled in many injection systems in response to two sensed engine parameters, intake air amount and engine speed. Where these two control parameters are employed there are certain difficulties, however, particularly in conjunction with two cycle engines. In the low load low speed range, such as at idling or when trolling with an outboard motor, it is difficult to stabilize the engine speed because the intake air amount fluctuates. Also, if the fuel control is varied in response to sensed engine speed and intake air amount, there is a time delay between the measuring of these parameters and the calculating of the engine fuel control parameters which can cause a delay in speed change response. This is particularly likely to cause a delay in speed increase when the engine is abruptly accelerated.

In order to eliminate some of the difficulties noted, it has been proposed to provide a fuel injection control system that has control phases relating to the load on the engine. For example, the engine can have control phases which differ depending upon whether the engine is operating in a low, medium or high load ranges. With such systems, when the throttle opening is set to a relatively small value, the engine is determined to be in the low load mode and the fuel control is only determined on the basis of engine speed without relation to intake air amount. As a result, the fluctuations resulting from the changes in intake air amount are eliminated. However, when the engine throttle is opened to a larger extent such as to indicate high load, then the fuel control is determined only on the basis of intake air amount regardless of actual engine speed. When the engine is operating in the mid range, the fuel control is determined by a mixture of the engine speed and intake air amount.

It should be understood that it would be possible, to provide a system that measures all parameters of the engine and contains a plurality of maps so as to provide the ideal fuel control under all conditions. However, such an arrangement would employ an extremely expensive and complicated computer and hence is not practical for large volume usage.

A system of control where the engine is operated by a control strategy as aforedescribed depending upon the load range, there are still some problems. These problems occur during transient conditions when the engine is being abruptly accelerated or decelerated. For example, when the engine is operating at a high speed and is abruptly decelerated, if the deceleration brings the speed of the engine into the low load range, then the control parameters are changed at once to values for lowering the engine speed and may cause the engine to be stalled. If the deceleration is into the medium load range and the fuel control parameters are varied relating to intake air amount and engine speed, the reaction time is slow due to the delay of measuring of the intake air amount and the engine speed will not be reduced smoothly from high speed to a lower speed.

Problems also can occur when the engine is operating at low speeds and is abruptly accelerated. If the acceleration is into the medium load range and the engine fuel control is then varied relative to intake air amount and engine speed, the reaction time again is slow due to the delay in the amount of intake air detection and the speed is not raised in a smooth manner.

There are also systems which do not divide the load conditions into three loads, as aforenoted, but only two loads, high load and low load. These systems also have the disadvantages already noted.

It is, therefore, a principal object to this invention to provide an improved fuel control system for a fuel injected internal combustion engine.

It is another object to this invention to provide a fuel control system for a fuel injected internal combustion engine that is relatively simple in operation and requires a minimum number of sensed conditions for the fuel control.

It is a yet further object to this invention to provide a fuel control system for a fuel injection unit of an internal combustion engine that improves the performance under transient conditions and still is able to be relatively simple and uncomplicated.

SUMMARY OF THE INVENTION

This invention is adapted to be embodied in a fuel injection system for an internal combustion engine that is comprised of a fuel injector for supplying fuel to the engine and operator control speed means for controlling the speed of the engine. Sensor means are provided for sensing certain engine running conditions and control means control the operation of the fuel injector in response to the conditions sensed by the sensor means. Means are also provided for sensing an abrupt change in the condition of the operator controlled speed means and means adjust the operation of the control means in response to a sensed abrupt change in the condition of the operator controlled speed means.

A further feature of the invention is adapted to be embodied in method of operating a fuel injection system for an internal combustion engine that has a fuel injector, sensor means for sensing engine running conditions, control means for controlling the operation of the fuel injector in response to conditions sensed by the sensor means. In accordance with this feature of the invention, an abrupt change in the condition of the operator controlled speed means is sensed and when this condition is sensed the operation of the control means is adjusted.

DETAILED DESCRIPTION OF THE PREFERRED EMBODIMENTS OF THE INVENTION

Figure 1:
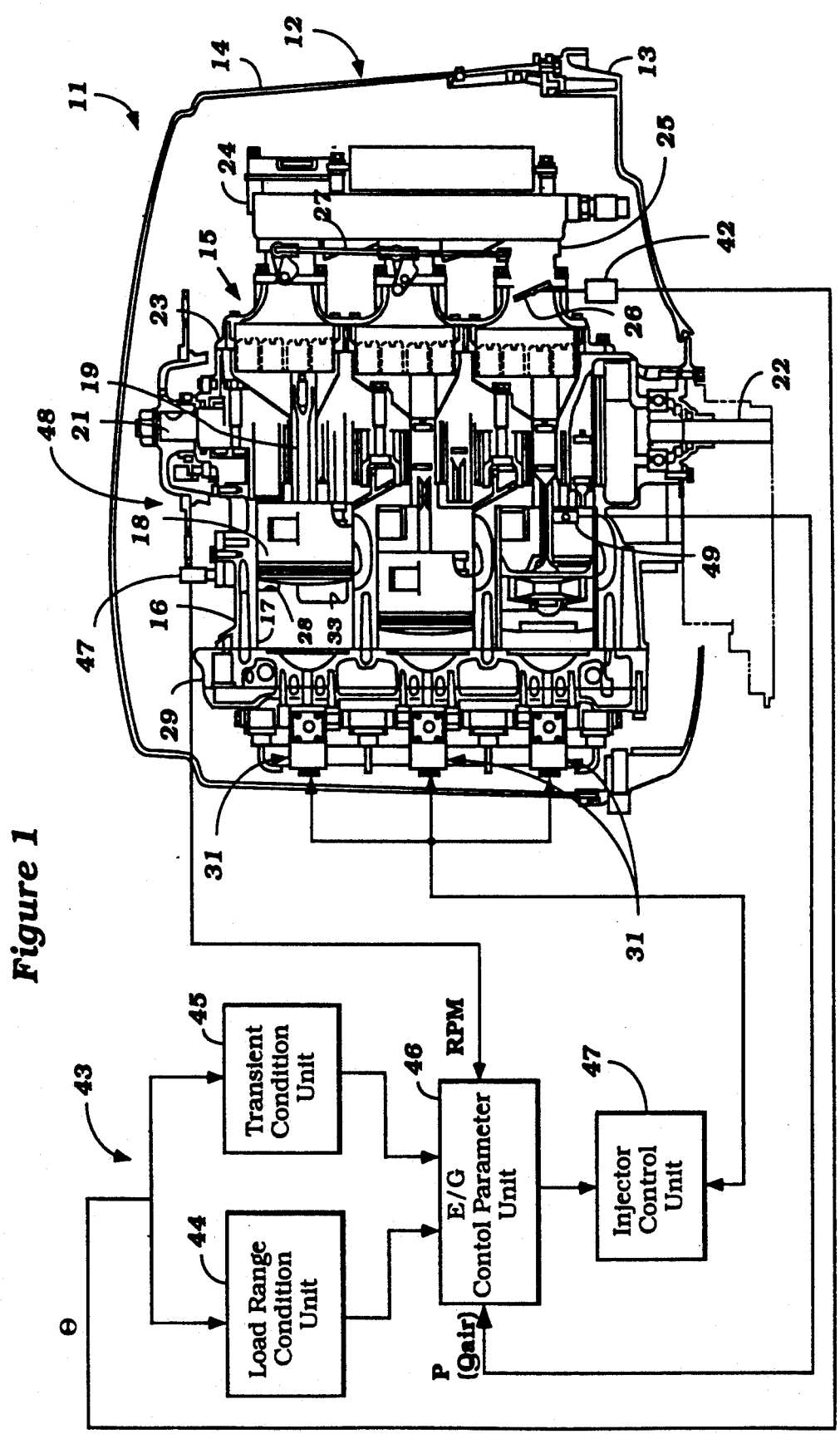
FIG. 1 is a cross sectional view taken through the power head of an outboard motor having an internal combustion engine with a fuel injection system constructed and operated in accordance with an embodiment of the invention and showing a portion of the control systems schematically.
Figure 2:
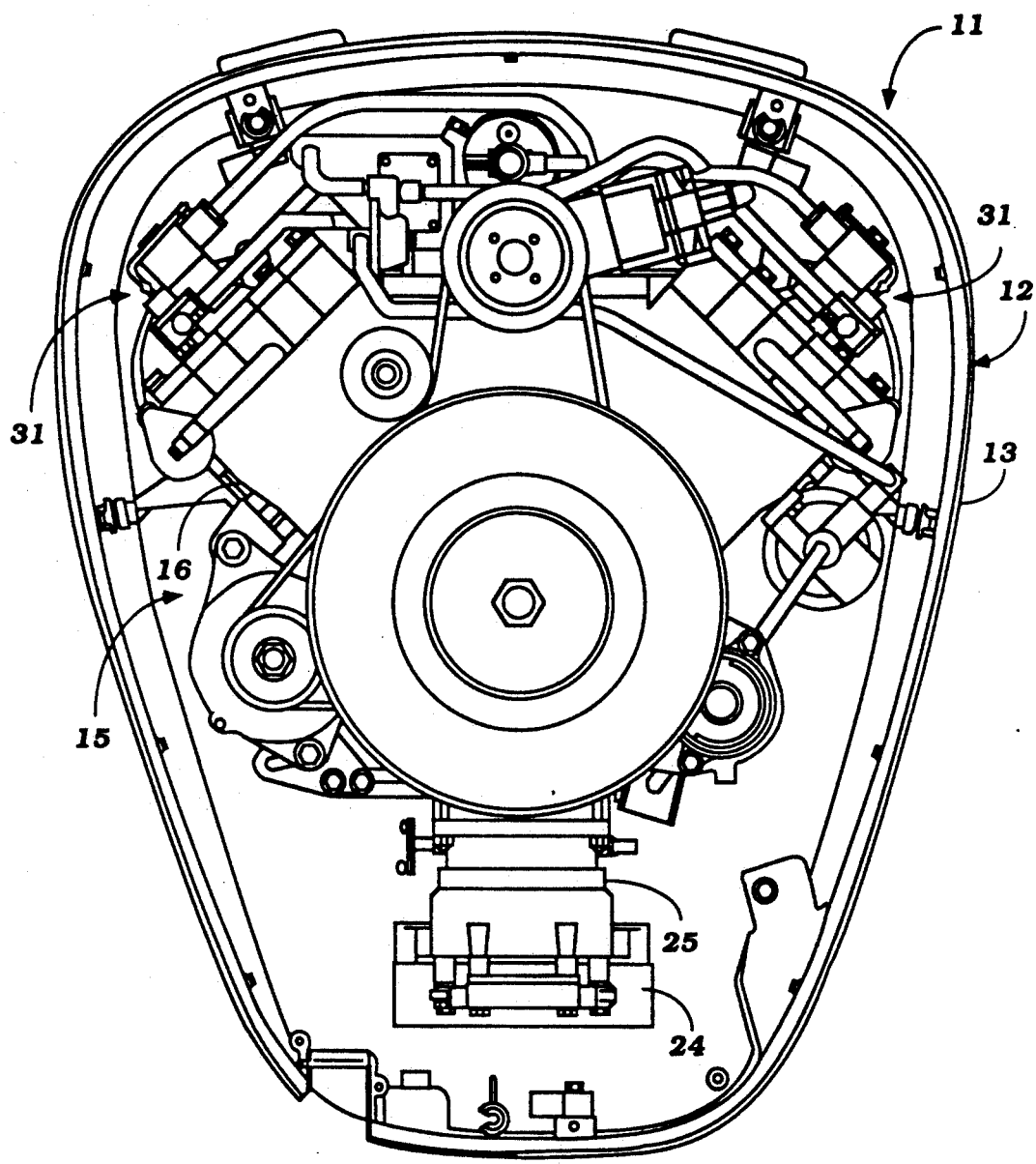
FIG. 2 is a top plan view of the outboard motor with a portion of the protective cowling removed.

Referring first to FIGS. 1 and 2, a portion of an outboard motor is shown partially and is identified generally by the reference numeral 11. The invention is described in conjunction with an outboard motor because outboard motors frequently employ two cycle, crankcase compression, internal combustion engines and the invention has particular utility in conjunction with such engines. It will be understood, however, by those skilled in the art that the invention or at least certain facets of it can be employed with engines operating other than on the two stroke principle and also engines other than reciprocating engines.

The outboard motor 11 includes a power head, indicated generally by the reference numeral 12 which is comprised of a lower tray portion 13 and a main cowling portion 14 which is removed in FIG. 2 so as to more clearly show the construction.

Contained within the protective cowling 12 is an internal combustion engine, indicated generally by the reference numeral 15, and which as aforenoted operates on a two stroke crankcase compression principle. The engine 15 is, in the illustrated embodiment, of the V-6 type although it will be readily apparent to those skilled in the art how the invention can be employed with engines having different numbers of cylinders.

The engine 15 includes a cylinder block 16 having angularly disposed cylinder banks each of which is formed with three cylinder bores 17. Each cylinder bore slideably supports a piston 18 which is connected to a connecting rod 19 which, in turn, drives a crankshaft 21. As is conventional in outboard motor practice, the crankshaft 21 rotates about a vertically extending axis and drives a drive shaft 22 which extends through the lower unit of the outboard motor (not shown) to drive a propulsion device in a well known manner.

The crankshaft 21 is rotatably journalled within a crankcase formed by the lower end of the cylinder block 16 and a crankcase member 23 which is affixed to the cylinder block 16 in a known manner. The chambers of the crankcase are divided so that there is a single chamber for each cylinder bore 17, as is well known in two cycle engine practice.

An air charge is delivered to each of the crankcase chambers from an air intake device 24 that is contained within the protective cowling 12. The air intake device 24 delivers air to a manifold 25 in which a plurality of flow controlling throttle valves 26 are positioned for controlling the speed of the engine 15 is a well known manner. The throttle valves 26 are all connected together by means of a linkage system 27 and are operated from a remotely positioned operator control mechanism of a well known type.

The air charge which is delivered to the crankcase chambers by the induction system described is then transferred to the area above the pistons 18 through a plurality of scavenge passages 28. This charge is then further compressed between the heads of the pistons 18 and a cylinder head assembly 29 which is affixed to the cylinder block 16 in a known manner.

Fuel is injected into the combustion chambers by air/fuel injector units, indicated generally by the reference numeral 31 and which have a construction which will be described later by particular reference to FIG. 3. This charge is then fired by spark plugs 32 to drive the pistons 18 downwardly. The burnt charge is then exhausted through exhaust ports 33 into an exhaust manifold (not shown) for discharge to the atmosphere through an underwater exhaust gas discharge, as is typical with outboard motor practice.

Figure 3:
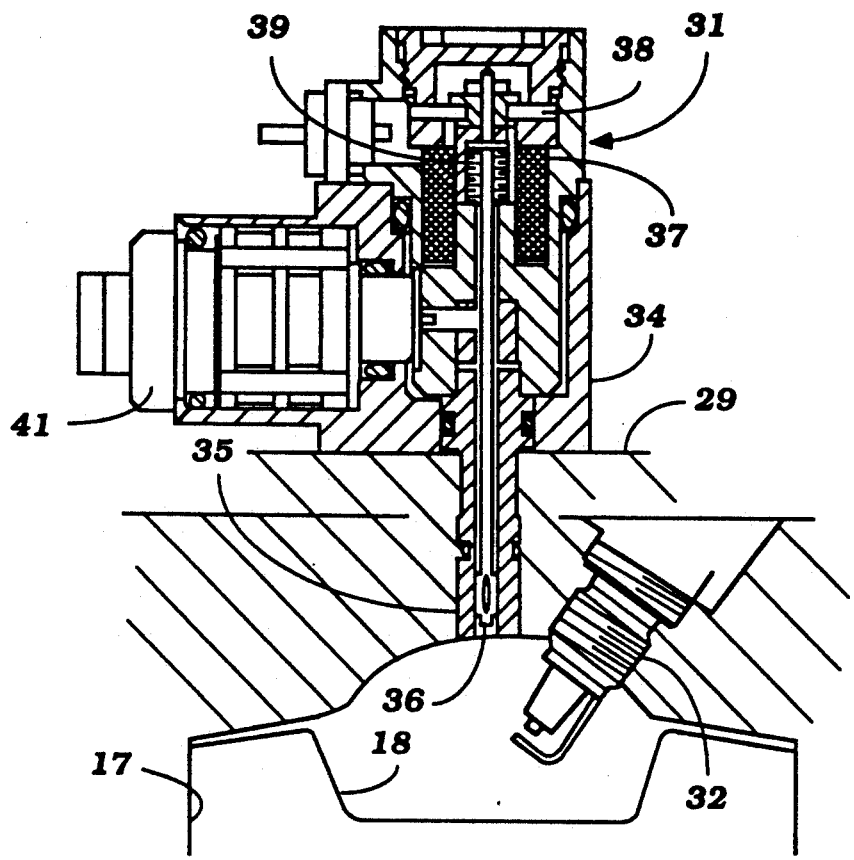
FIG. 3 is an enlarged cross sectional view taken through one cylinder of the engine and shows the fuel injector and its relationship to the combustion chamber of the engine.
Figure 4:
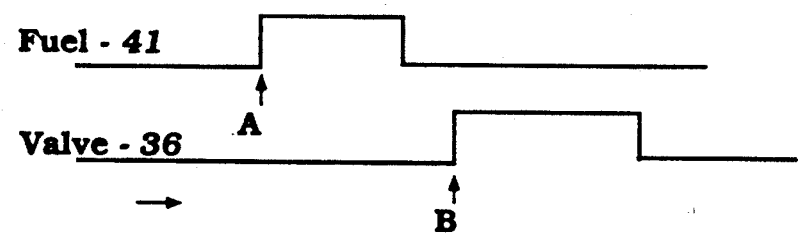
FIG. 4 is a graphical view showing the fuel and injection valve timing of the embodiment.

Referring now to FIGS. 3 and 4, as has been noted the injector 31 is an air/fuel injector. Of course, the invention can be employed in conjunction with injectors that inject only fuel as well as injectors that inject fuel and air. The injector 31 includes a housing assembly 34 having a lower portion 35 that is fixed into the cylinder head 29 and which defines a valve seat with which an injector valve 36 cooperates. The injector valve 36 is electrically operated by means of a solenoid 37 positioned within the upper end of the housing 34 and which cooperates with an armature 38 that is affixed to the upper end of the injector valve 36. A coil compression spring 39 acts to urge the armature 38 and injector valve 36 to its closed position.

Fuel is supplied to a chamber of the housing assembly 34 by a high pressure fuel injector 41 that receives fuel under pressure from a high pressure pump (not shown). In addition, compressed air is also delivered to this or another chamber from a high pressure air pump (not shown). The chamber is normally charged with air under pressure at all times and fuel is delivered to the chamber by the fuel injector 41 as shown in FIG. 4 upon the initiation of a fuel injection pulse at the point in time A. The amount of fuel injected is varied by changing the duration of the pulse.

The injector valve 36 is opened at a time B by energizing the solenoid 37 and the injector valve 36 is held open for a predetermined time period to permit the fuel and air charge to be admitted to the combustion chamber. The described construction assumes that fuel is delivered to the chamber before the injector valve 36 is opened. It should be obvious that other types of strategies can be employed wherein fuel is injected only at the time when the injector valve 36 is opened.

The actual type of injector employed is not critical to the invention inasmuch as the invention relates to the manner in which the fuel injection is controlled rather than the particular type of injector employed. Also, the strategy for providing the amount of fuel required for a given running condition may be of any conventional type and preferably is one that is divided into low ranges such as low load low speed, medium load medium speed and high load high speed. In such a system the low load fuel requirements are provided primarily in response to the sensing of the engine speed of the engine while at the high load high speed condition, the requirements are met by sensing primarily the throttle position. In the intermediate or mid-range, a combination of these signals are employed to provide the fuel control. Alternatively, the invention may be employed in systems that divide the engine control into only low and high speed ranges and sense parameters, as aforenoted.

Figure 5:
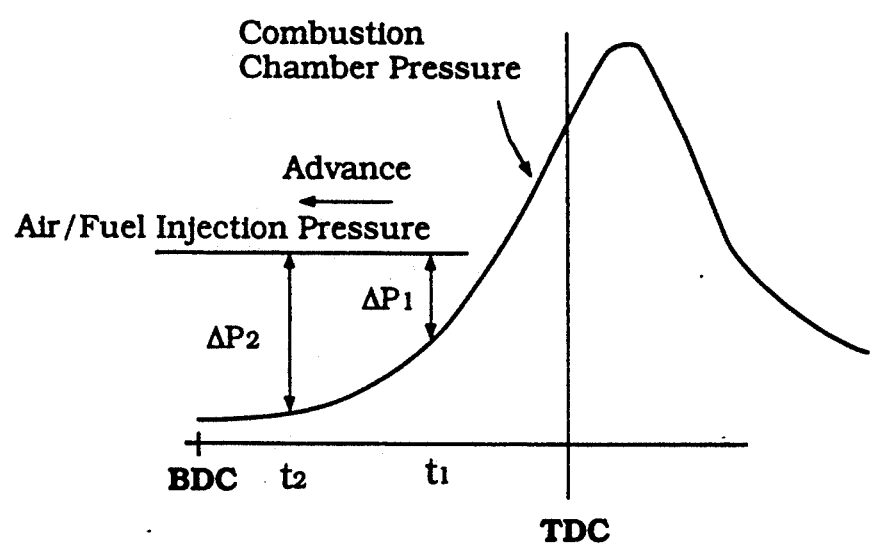
FIG. 5 is a graphical view of pressure in relation to crank angle showing how the injection timing can vary the amount of fuel injected.

The invention, however, is concerned with adjusting the amount of fuel supplied in response to sudden acceleration or deceleration under certain conditions, as will be described. The amount of fuel supplied may be adjusted either by adjusting the duration of fuel injection from the injector 41 or the timing of the injection. FIG. 5 is a graphical view showing how the timing of injection will be effective to change the amount of fuel which is actually injected.

FIG. 5 is a graphical view wherein the curve shows the combustion chamber pressure in relation to crank angle. If it is assumed that the pressure of the air supplied by the fuel/air injector 41 is constant and, therefore, it should be readily seen that if the injector valve 36 is opened at the time $t_1$ there will be a pressure difference P1 that is relatively small and hence a relatively small amount of fuel and air will be injected for a given duration of injection. If, however, the injection time is advanced to the time $t_2$ then there will be a greater pressure difference P2 and hence a greater amount of fuel and air will be injected during a given period of injection. In addition to changing the amount of fuel and air injected either by changing duration or timing, a combination of these two methods may be employed.

Referring again primarily to FIG. 1, the engine 15 is provided with a control system embodying certain components, shown in block form, and certain sensors for sensing engine operating characteristics. These engine condition sensors include a throttle position sensor 42 that is associated with one of the throttle valves 26 and which outputs a signal to the control circuit, indicated generally by the reference numeral 43 and specifically to a load range condition sensing unit 44 and a transient operation recognizing unit 45. The load range unit 44 determines the load range that the engine 15 is operating. That is, if the control system 43 operates during three distinct load ranges (low, medium and high) or one with only two range (low and high) the unit 44 determines which range the engine is operating in from the degree opening of the throttle valves 26.

The transient condition sensing unit 45, on the other hand, senses actual position of the throttle valves 26 at selected time increments and hence will provide an indication of when the throttle valve 26 is being opened or closed rapidly to indicate rapid acceleration or deceleration.

The units 45 and 46 output their signals to an engine control parameter determining unit 46 which will determine the necessary amount of fuel. The unit 46 also receives a speed and crank angle signal from a pulser coil 47 of a magneto type ignition system 48 and a pressure signal P from a crankcase pressure sensor 49. Under steady state running conditions, the unit 46 outputs a fuel control signal to a driver or injection control circuit 47 which controls the air/fuel injectors 31 and also the fuel injector portion 41 thereof so as to provide the desired fuel/air mixture.

As previously noted, under steady state running conditions, the amount of fuel supplied is determined solely by the engine load as determined either by the position of the throttle valve 26 or the air flow as determined by the sensor 49 or a combination thereof, depending upon the specific strategy. However, when the transient condition sensing unit 45 senses a rapid acceleration or deceleration through rapid opening or closing of the throttle valves 26, as determined by the position sensor 42 and the time in the unit 45, then the amount of fuel supplied is adjusted so as to improve running in accordance with a control strategy, for example as shown in FIG. 6.

Figure 6:
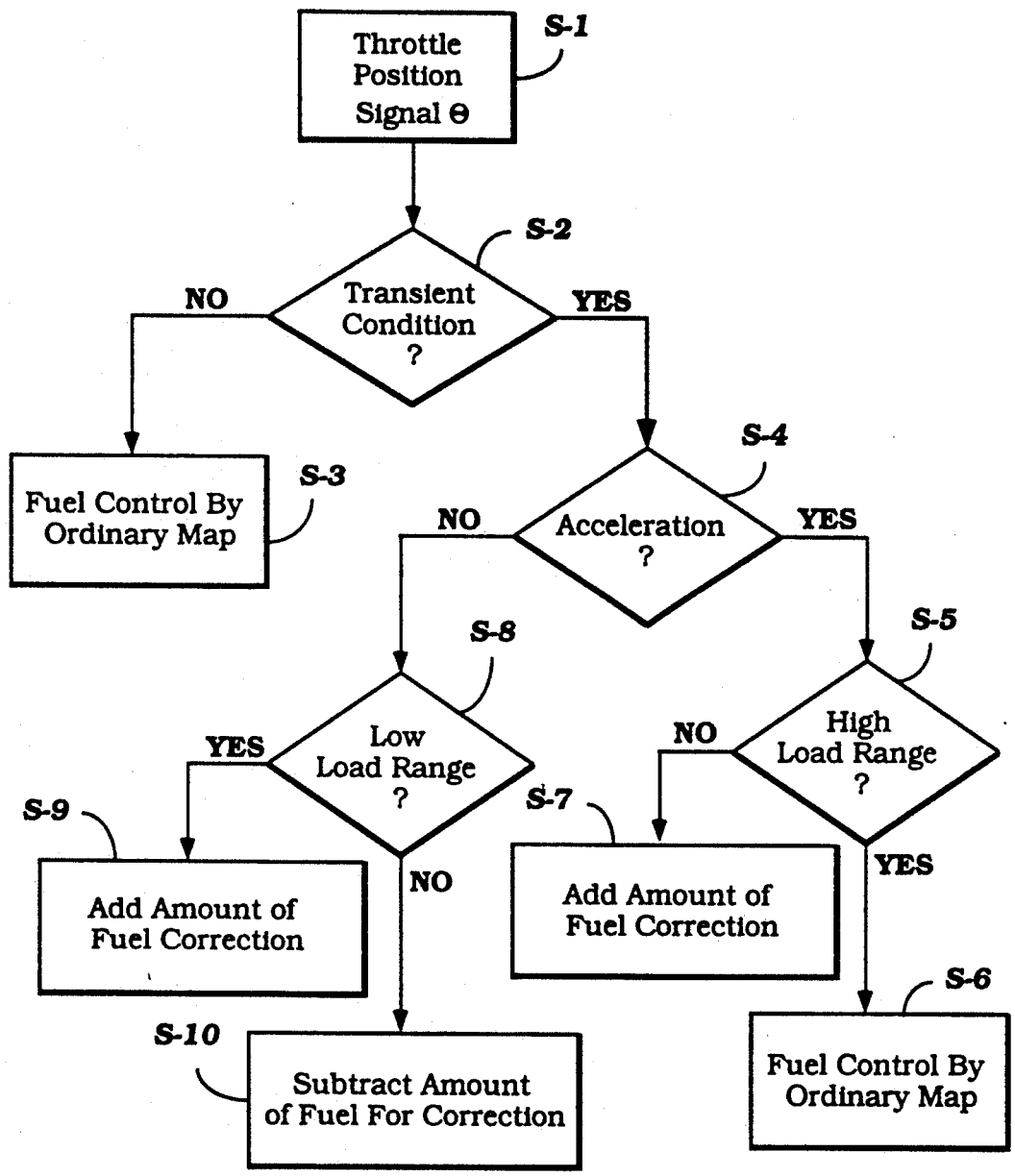
FIG. 6 is a block diagram showing the control routine in accordance with one embodiment of the invention.

The routine of FIG. 6 is that that is employed when the main control system operates in three different load ranges, low, medium and high. The program starts at the step S1 and reads the throttle position by the throttle position sensor 42 and the transient load condition unit 45 then at the step S2 makes a determination whether the throttle position is being held constant or is changing. If there is not a transient condition, the program moves to the step S3 so as to set the fuel control by the fuel parameter control unit 46 from an ordinary map of the type employed to set the fuel control for steady state conditions.

If, however, as the step S2 it is determined that the engine is in a transient condition, the program moves to the step S4 to determine if there is acceleration or deceleration. If at the step S4 it is determined that the engine is accelerating, the program moves to the step S5 to determine which load range the engine is operating in. If the engine is already in the high load range, no adjustment is required in the amount of fuel supplied in order to obtain smooth running and the program moves to the step S6 so as to have fuel control accomplished by the ordinary map in the engine control parameter unit 46. If, however, the engine is not operating in the high load range, then the program moves to the step S7 so as to increase the amount of fuel injected by either increasing the duration or advancing the timing of the fuel injection or a combination of both. By adding the amount of fuel, it will be insured that smooth and prompt acceleration will occur. If the amount of fuel injected is not increased and/or the timing of the fuel injection is advanced, there will be hesitation in the acceleration.

If at the step S4 it is determined that the engine is not accelerating, then it is obvious that the engine is being decelerated and the program moves to the step S8 to determine if the engine is operating in the low load range. If the engine is in the low load range and it is being decelerated, the supply of the amount of fuel determined by the actual load range may be so low as to cause the engine to stall. To avoid this, the program moves to the step S9 so as to add an amount of fuel correction either by increasing the duration of the time of fuel injection or advancing the initiation of fuel injection or both.

If at the step S8, it is determined that the engine is not operating in the low load range, then the program moves to the step S10 to decrease either the amount of fuel injected or retard the timing of the starting of fuel injection so as to provide a smoother decrease in engine speed.

Figure 7:
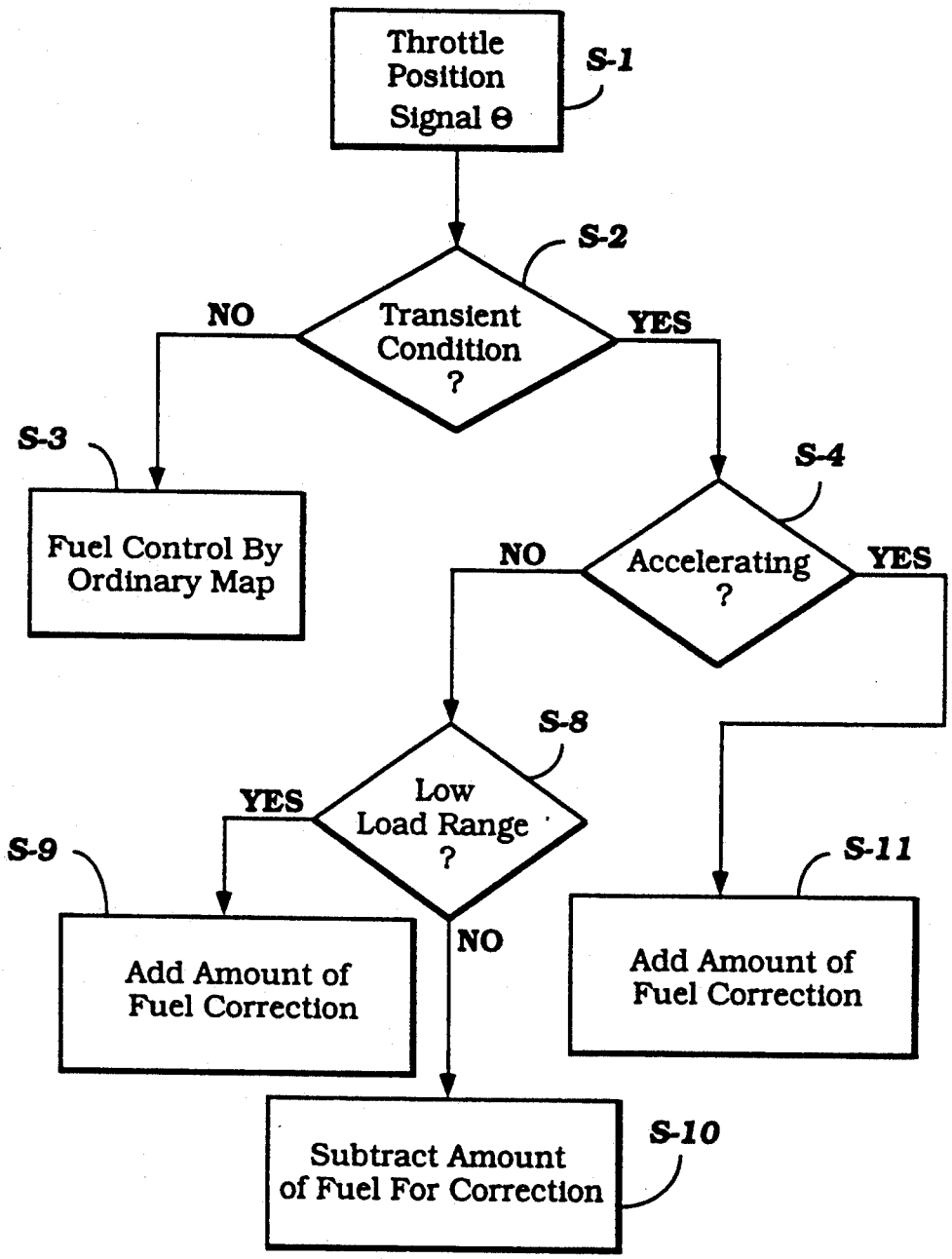
FIG. 7 is a block diagram showing the control routine in accordance with another embodiment of the invention.

As has been previously noted, the system may also be employed in conjunction with engines that have fuel control systems that only operate over two ranges, low load and high load. FIG. 7 shows such a control routine which has certain steps which are the same as those of the control routine for a three range operations and where that is the case those steps have been identified by the same reference numerals.

Like the previous program, this program starts at the step S1 to determine the throttle valve position data and then move to the step S2 wherein the transient condition sensing unit 45 determines if the engine is operating at a transient condition or not. If not, the program moves to the step S3 so as to set the fuel control by the ordinary map in the engine control parameter unit 46.

If at the step S2 it is determined that the engine is not in a transient condition, then the program moves to the step S4 to determine if the engine is accelerating or not. If the engine is not accelerating then the program moves to the step S8, as with the previously described control routine, to see if the engine is operating in the low load range. If the engine is in the low load range, then the program moves to the step S9 to increase the fuel supply either by increasing the duration or advancing the timing of the beginning of injection so as to prevent stalling, for the reasons noted in connection with the description of the embodiment of FIG. 6.

If, however, at the step S8 it is determined that the engine is not operating in the low load range, then the program moves to the step S10 so as to either decrease the amount of fuel injected or retard the timing of initiation of fuel injection or a combination of them to provide a smooth engine speed decrease.

If at the step S4 it has been determined that the engine is accelerating, then the program moves to a step S11 so as to either increase the amount of fuel injected or advance the fuel injection initiation or a combination thereof so as to provide a smooth and rapid acceleration.

It should be readily apparent from the foregoing description that the described embodiments of the invention are extremely effective in providing good fuel control for an engine during transient condition so as to preclude stalling and promote smooth operation. Of course, the described embodiments are those which are preferred forms of the invention and various changes and modifications may be made without departing from the spirit and scope of the invention, as defined by the appended claims.

I claim:

1. A fuel injection system for an internal combustion engine comprising a fuel injector for supplying fuel to said engine, operator controlled speed means for controlling the speed of said engine, sensor means for sensing certain engine running conditions, control means for controlling the operation of said fuel injector in response to the conditions sensed by said sensor means in response to sensed load ranges of said engine, means for sensing an abrupt change in the condition of said operator controlled speed means, and means for adjusting the operating of said control means in response to a sensed abrupt change in the condition of said operator control speed means and only when said engine is operating in certain load ranges, said means for adjusting the operation of said control means provides either fuel increase or advancing in the timing of fuel injection when said operator speed control is moved in a direction causing the engine to decelerate and when the engine is in the low load range.

2. A fuel injection system as set forth in claim 1 wherein the means for adjusting provides no adjustment when the engine is accelerating and is in the high load range.

3. A fuel injection system as set forth in claim 1 wherein the means for adjusting the operating of the control means decreases the amount of fuel injected or retards the timing of fuel injection when the engine is decelerating and is not in the low load range.

4. A fuel injection system as set forth in claim 1 wherein the means for adjusting increases the duration or advances the timing of fuel injection when the engine is accelerating.

5. A fuel injection system as set forth in claim 4 wherein the duration of fuel injection is increased or the timing is advanced only when the engine is not in the high load range.

6. A fuel injection system as set forth in claim 5 wherein the means for adjusting the operating of the control means decreases the amount of fuel injected or retards the timing of fuel injection when the engine is decelerating and is not in the low load range.

7. A method of operating a fuel injection system for an internal combustion engine comprising a fuel injector for supplying fuel to said engine, operator controlled speed means for controlling the speed of said engine, sensor means for sensing certain engine running conditions, comprising the steps of controlling the operation of said fuel injector in response to the conditions sensed by said sensor means in response to sensed load ranges of said engine, sensing an abrupt change in the condition of said operation controlled speed means, and adjusting the operation of said fuel injector in response to a sensed abrupt change in the condition of said operator control speed means and only when said engine is operating in certain load ranges while accelerating, the adjustment providing either fuel increase or advancing in the timing of fuel injection when the engine is decelerating and in the low load range.

8. A method of operating a fuel injection system as set forth in claim 7 wherein no adjustment is made when the engine is accelerating and is in the high load range.

9. A method of operating a fuel injection system as set forth in claim 7 wherein the adjustment decreases the amount of fuel injected or retards the timing of fuel injection when the engine is decelerating and is not in the low load range.

10. A method of operating a fuel injection system as set forth in claim 7 wherein the adjustment increases the duration or advances the timing of fuel injection when the engine is accelerating.

11. A method of operating a fuel injection system as set forth in claim 10 wherein the duration of fuel injection is increased or the timing is advanced only when the engine is not in the high load range.

12. A fuel injection system for an internal combustion engine comprising a fuel injector for supplying fuel to said engine, operator controlled speed means for controlling the speed of said engine, sensor means for sensing certain engine running conditions, control means for controlling the operation of said fuel injector in response to the conditions sensed by said sensor means, means for sensing an abrupt change in the condition of said operator controlled speed means, and means for adjusting the operating of said control means to provide either a fuel increase or an advance in the timing of fuel injection in response to a sensed abrupt change in the condition of said operator control speed means causing a sudden deceleration of said engine.

13. A fuel injection system as set forth in claim 12 wherein the means for adjusting is operative only when the engine is operating in certain load ranges.

14. A fuel injection system as set forth in claim 13 wherein the means for adjusting provides no adjustment when the engine is accelerating and is in the high load range.

15. A fuel injection system as set forth in claim 13 wherein the means for adjusting the operation of the control means provides either fuel increase or advancing in the timing of fuel injection when the engine is decelerating and in the low load range.

16. A fuel injection system as set forth in claim 13 wherein the means for adjusting the operating of the control means decreases the amount of fuel injected or retards the timing of fuel injection when the engine is decelerating and is not in the low load range.

17. A fuel injection system as set forth in claim 16 wherein the means for adjusting the operation of the control means provides either fuel increase or advancing in the timing of fuel injection when the engine is decelerating and in the low load range.

18. A fuel injection system as set forth in claim 12 wherein the means for adjusting increases the duration or advances the timing of fuel injection when the engine is accelerating.

19. A fuel injection system as set forth in claim 18 wherein the duration of fuel injection is increased or the timing is advanced only when the engine is not in the high load range.

20. A fuel injection system as set forth in claim 19 wherein the means for adjusting the operation of the control means provides either fuel increase or advancing in the timing of fuel injection when the engine is decelerating and in the low load range.

21. A fuel injection system as set forth in claim 19 wherein the means for adjusting the operating of the control means decreases the amount of fuel injected or retards the timing of fuel injection when the engine is decelerating and is not in the low load range.

* * * * *